United States Patent [19]

Boylan

[11] Patent Number: 4,492,003
[45] Date of Patent: Jan. 8, 1985

[54] FILTER CLEANING DEVICE

[76] Inventor: John F. Boylan, Rte. 1 - Box 70, Ulysses, Kans. 67880

[21] Appl. No.: 516,527

[22] Filed: Jul. 25, 1983

[51] Int. Cl.³ .............................................. B08B 5/02
[52] U.S. Cl. ...................................... 15/406; 55/302; 134/183
[58] Field of Search ...................... 15/304, 316 R, 406, 15/407, 405; 55/302; 134/183, 22.1

[56] References Cited

U.S. PATENT DOCUMENTS

| | | |
|---|---|---|
| 457,603 | 8/1891 | Fox . |
| 578,142 | 3/1897 | Fierz . |
| 956,668 | 5/1910 | Becker .................................. 15/406 |
| 1,198,276 | 9/1916 | Rival et al. . |
| 1,769,061 | 7/1930 | Hitchcock . |
| 1,830,098 | 11/1931 | Dollinger . |
| 2,999,264 | 9/1961 | Stearns . |
| 3,216,429 | 11/1965 | Dick . |
| 3,566,892 | 3/1971 | Logue et al. . |
| 3,665,547 | 5/1972 | Boylan .................................. 15/406 |
| 3,936,902 | 2/1976 | Shackleton et al. .................. 15/304 |

Primary Examiner—Chris K. Moore
Attorney, Agent, or Firm—Litman, Day & McMahon

[57] ABSTRACT

A filter cleaning device for purging filters made of porous material employs a tank containing pressurized air and a flow conduit communicating with the tank. A shield mounted on the flow conduit is shaped to engage the filter whereby the pressurized air is suddenly released into an interior chamber of the filter upon actuating a flow valve. An extensible member such as a spring is mounted inside the conduit and has a air flow diverter attached to its lower end so that, upon the sudden rush of air, the flow diverter spreads the air outwardly and radially toward the filter medium and the extensible member gradually extends so that dust is purged substantially from all parts of the filter.

5 Claims, 4 Drawing Figures

FILTER CLEANING DEVICE

The present invention relates to filter cleaning devices and more particularly to a filter cleaning device adapted to provide a rapid pressure increase within an interior chamber of a filter to be cleaned for reverse cleaning flow.

BACKGROUND OF THE INVENTION

The present device is particularly adapted to cleaning vehicular air filters for tractors, earth-moving equipment and the like, as such air filters, particularly during agricultural operations, quickly become clogged with dust and engine performance is degraded. Clogged air filters can lead to excessive fuel consumption and engine wear and since such filters can run to significant expense, cleaning, at least for several times per filter, is advantageous. Quite often filters are cleaned merely by shaking or striking against a flat surface, such as a floor, in an attempt to dislodge the dust particles. My previous U.S. Pat. Ser. No. 3,665,547 was directed to a reverse air pressure cleaning device employed a tank of pressurized air, a conduit having an outflow valve and a shield having an inner surface which seals against the upper edge of an air filter with the bottom end of the air filter sealed or held against a supporting floor surface. Thus, a blast of air could be released into the inner chamber of the filter to dislodge the dust and particulate matter in the reverse direction from which it became lodged in the filter. This proved particularly useful, however, it was noted that certain places or portions of the filter became better cleaned than others. What was needed and is provided by the present invention, is an improvement upon my basic concept which effectively cleans the air filter from top to bottom by means of a quick blast of pressurized air.

OBJECTS OF THE INVENTION

The principal objects of the present invention are: to provide a filter cleaning device particularly adapted to clean filters having a porous medium, such as of paper fibers, paper, fibers and foam such as used in air cleaners for the engine and the like of vehicles, tractors and other equipment; to provide such a filter cleaning device which provides a rapid pressure increase within an interior chamber of the filter to be cleaned for reverse flow cleaning operations; to provide such a filter cleaning device which includes a means which diverts the flow of pressurized air outwardly and radially and to the filter cleaning medium; to provide such a filter cleaning device which cleans the filter from top to bottom thereof; and to provide such a filter cleaning device which is economical to manufacture, durable in construction, and particularly well adapted for the proposed purpose.

Other objects and advantages of this invention will become apparent from the following description taken in conjunction with the accompanying drawings wherein are set forth, by way of illustration and example, certain embodiments of this invention.

DESCRIPTION OF THE PREFERRED EMBODIMENT

Figure 1:
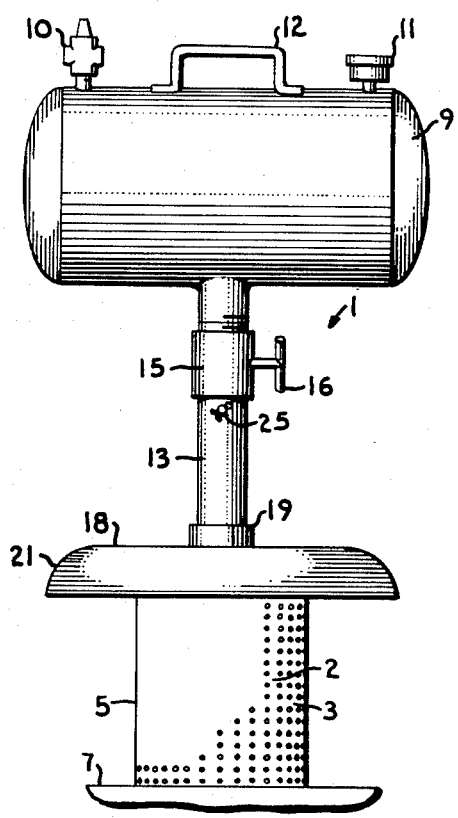
FIG. 1 is a front elevational view of the filter cleaning device embodying the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a filter cleaning device for cleaning a porous filter media 3, such as fibers, foam, paper or the like and used as an air cleaner for automotive vehicles, farm tractors and the like. The vehicles travel through air having dirt and dust particles in suspension whereby the filter media 3 within the filter 2 becomes clogged with the dirt and dust particles, thereby restricting the flow of air through the filter 2, which reduces the efficiency of the engine in the respective vehicle.

Filters are expensive and the filter media 3 is usually in good condition except for the dirt and dust particles therein whereby cleaning the filter media 3 is more economical than and preferable to replacement of the entire filter 2.

The filter 2 may be of any type adapted to clean air flowing through a filter media 3 which collects dirt and dust particles therein, such as a filter having the filter media 3 in the form of a tube having a chamber 4 therein with the filter media being enclosed within a cage 5 formed of a reticulated material, such as a wire fabric, and openings 6 in one end thereof to receive a conduit for flow of clean air to the point of use, such as in the engine of an automotive vehicle, farm tractor, and the like.

The filter cleaning device 1 is operative to effect a rapid flow of fluid, such as air under pressure, through the filter media 3 in a direction opposite the flow of air therethrough during normal use, thereby effecting a reverse pressure cleaning on the filter media 3 of the filter 2. As shown in FIG. 1, the filter 2 is positioned between the filter cleaning device 1 and a supporting surface, such as the floor 7. The weight of the device 1 tends to promote leak-free sealing between the device 1 and the filter 2 and also between the filter 2 and the floor 7.

In the illustrated example, a pneumatic pressure tank 9 contains a suitable gas fluid, such as air pressure and has an air pressure inlet 10 mounted on the tank 9 for charging the tank. Preferably, the air pressure inlet 10 is of the quick connection or chuck type for communicating with the hose of an air compressor. The tank may also have a pressure gauge 11 mounted on the tank 9 for visually displaying the amount of pressure. A handle 12 provides a handhold for portability.

An elongate flow conduit 13 communicates with the tank 9 and extends from a point spaced from the pressure inlet 10. A valve member 15 is mounted in the flow conduit 13 to control the flow of fluid therethrough; the valve member 15 is preferably a quick opening valve of the ball type for providing straight through flow from the tank 9 through the flow conduit 13. The valve member 15 includes an externally mounted handle 16 for ease of grasping and turning by the user.

In the illustrated example, the shield 18 is generally annular and concave and has a mounting boss 19 extending from the shield 18 and connectible to the free end of the flow conduit 13, as by being threaded. The mounting boss 19 preferably extends or projects downwardly from the shield 18 a short distance and has a size corresponding to the size of the opening 6 in the end of the filter 2 to center the filter 2 under the shield 18 so that the pressurized air from the tank 9 flows directly into the interior chamber 4 of the filter 2.

The shield 18 is shaped to sealingly engage the one end of the filter 2 through its opening 6 whereby all of the gas or air flowing through the conduit 13 flows into the chamber 4 within the filter media 3 and outwardly through the filter media to expel dirt and dust particles and the like from the filter media 3 to clean the same. In the illustrated example, the shield 18 has a gasket 20 to provide a seal between the filter 2 and the shield 18. The shield 18 also has a downwardly flared or angled skirt 21 to direct dust and the like expelled from the filter downwardly and away from the user.

Figure 3:
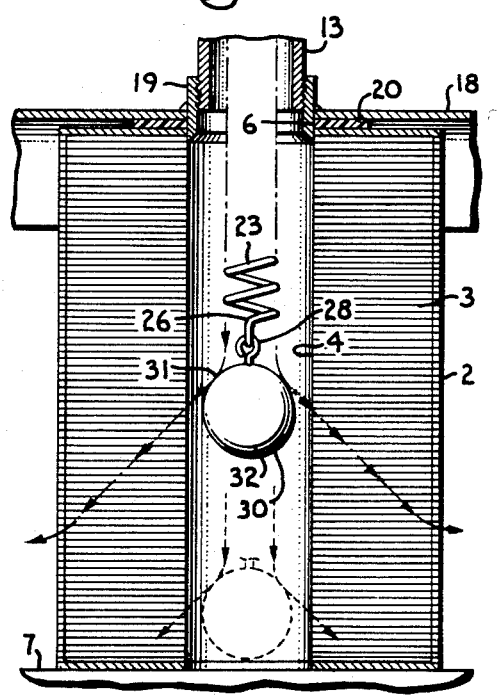
FIG. 3 is an enlarged, fragmentary, longitudinal sectional view of a portion of the filter cleaning device.
Figure 4:
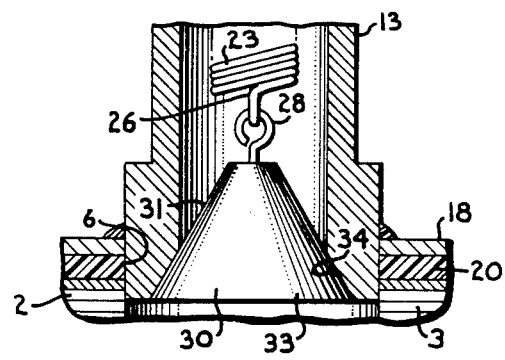
FIG. 4 is an enlarged, fragmentary view of an alternative embodiment of the filter cleaning device.

An extensible member 23, such as a coil spring, is mounted in the flow conduit 13. In the illustrated example, the extensible member has an upper end 24 secured, as by a pin 25 to the walls of the flow conduit 13, and a lower end 26 attached, as by a hook and eyelet 28, to a flow diverter means 30. The flow diverter means 30 has an upper surface 31 which is round or sloped to divert the flow of gas coursing through the flow conduit 13 and directs same sidewardly such as shown by the flow indication arrows in FIGS. 2 and 3. In the preferred embodiment, FIGS. 2 and 3, the flow diverter means is a ball 32. In an alternative embodiment, FIG. 4, the flow diverter means 30 is a cone 33. Preferably, both the ball 32 and cone 33 have a diameter at its widest part which is substantially equal to or slightly larger than the inside diameter of the conduit 13 to provide a partial plug for the flow conduit which pops free with the rush of air.

Preferably, the ball 32 or cone 33 is of neophrene, rubber or other soft material to provide a sufficient seal with the end of the conduit 13. When the cone 33 is used, an angled seat 34 is employed at the end of the conduit 13 for sealing.

Figure 2:
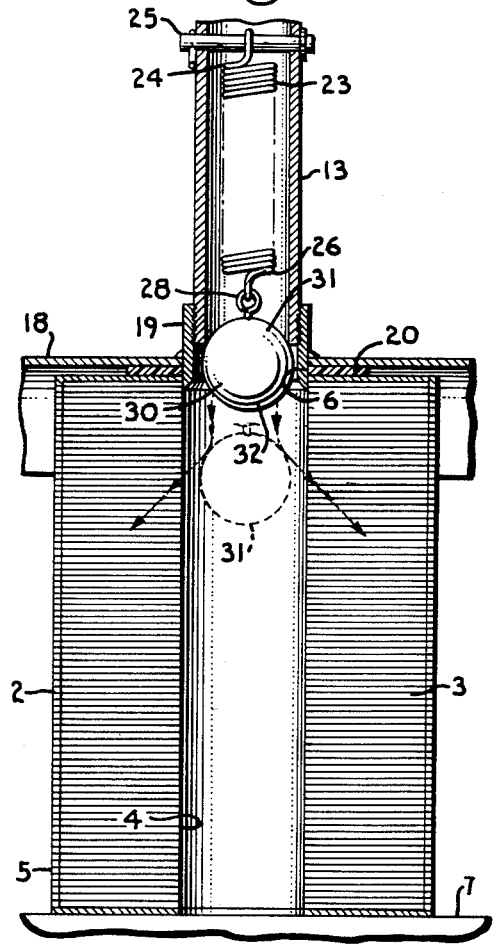
FIG. 2 is an enlarged, fragmentary, longitudinal sectional view of a portion of the filter cleaning device.

Preferably, the extensible member 23 is a coil spring with the proper tension so when the valve member 15 is actuated, the rush of air from the pressure tank 9 forces the air diverter means 30 to pull on the spring extensible member 23 and extend below its former position, FIG. 2, three to five inches, depending upon the pressure of the tank 9. As the extensible member 23 begins to extend, the flow diverter means 30 becomes variably positioned within the air filter chamber 4 between an upper position, FIG. 2 and a lower position, FIG. 3. The air flow over the flow diverter means 30 is directed sidewardly and radially therefrom for substantially the entire length of the filter 2 so that the filter is evenly cleaned as the flow diverter means travels downwardly. When the air pressure is exhausted, or the valve member 15 closed, the flow diverter means 30 returns to its upward position, FIG. 2, in readiness for subsequent use.

It is to be understood that while certain forms of the present invention have been illustrated and described herein, it is not to be limited to the specific forms or arrangement of parts described and shown.

What is claimed and desired to be secured by Letters Patent is as follows:

1. A portable cleaning device for purging a filter; said filter having a medium surrounding and defining a chamber, and having at least one end with an opening to said chamber, said cleaning device comprising:
   (a) a tank for containing pressurized gas;
   (b) charging means on said tank for filling same;
   (c) a conduit extending from said tank and having an end with an outflow valve therewith to permit rapid passage of gas through said conduit;
   (d) a shield on said conduit adjacent said end and having a surface extending outwardly from said conduit for sealing engagement with said filter around the end opening thereof with said conduit end communicating with said filter chamber end communicating with said filter chamber through said filter end opening; said filter being held in place by a user by positioning said filter between said shield surface and a supporting surface; and
   (e) an extensible member longitudinally mounted within said conduit and having a lower end portion with a gas diverter means thereon for forcing gas flow from said tank radially outwardly through said medium to thereby purge it, said diverter means being movable between an upper position located adjacent an upper part of said chamber and a lower position located adjacent a lower part of said chamber; said extensible member and diverter means being responsive to gas flow from said tank to extend and variably position said diverter means between said upper and lower positions.

2. The cleaning device set forth in claim 1 wherein:
   (a) said extensible member is an elongate coil spring.

3. The cleaning device set forth in claim 1 wherein:
   (a) said diverter means has a rounded upper surface to divert the flow of said gas radially outwardly.

4. The cleaning device set forth in claim 3 wherein:
   (a) said diverter means is a ball and said ball has a diameter substantially equal to the inside diameter of said conduit.

5. The cleaning device set forth in claim 1 wherein:
   (a) said diverter means is a cone.

\* \* \* \* \*